US012682514B2

(12) United States Patent　　　　　(10) Patent No.:　US 12,682,514 B2

García Capel et al.　　　　　　　　　　(45) Date of Patent:　　Jul. 14, 2026

(54) METHOD FOR COLOR IMAGING USING ARBITRARY-COLOR-FILTER-ARRAY EVENT DATA AND IMAGE SENSOR

(71) Applicant: OMNIVISION TECHNOLOGIES, INC., Santa Clara, CA (US)

(72) Inventors: Luis Eduardo García Capel, Singapore (SG); Bo Mu, Santa Clara, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 292 days.

(21) Appl. No.: 18/400,239

(22) Filed: Dec. 29, 2023

(65) Prior Publication Data

US 2025/0218063 A1　　Jul. 3, 2025

(51) Int. Cl.

| | |
|---|---|
| *G06T 11/10* | (2026.01) |
| *G06T 7/90* | (2017.01) |
| *G06V 10/56* | (2022.01) |
| *H04N 23/84* | (2023.01) |
| *H04N 25/11* | (2023.01) |
| *H04N 25/76* | (2023.01) |

(52) U.S. Cl.

CPC ................ *G06T 11/10* (2026.01); *G06T 7/90* (2017.01); *G06V 10/56* (2022.01); *H04N 23/84* (2023.01); *H04N 25/11* (2023.01); *H04N 25/76* (2023.01); *G06T 2207/10024* (2013.01)

(58) Field of Classification Search

None

See application file for complete search history.

(56) References Cited

U.S. PATENT DOCUMENTS

| | | | | |
|---|---|---|---|---|
| 5,047,861 | A * | 9/1991 | Houchin .............. | H04N 25/673 |
| | | | | 348/254 |
| 10,321,081 | B2 * | 6/2019 | Watanabe .............. | H04N 25/46 |
| 11,330,211 | B2 * | 5/2022 | Mehta ................... | H10F 39/802 |
| 2012/0151189 | A1 * | 6/2012 | Kruecken ........... | G06F 9/30105 |
| | | | | 712/E9.023 |
| 2021/0400223 | A1 | 12/2021 | Kitano et al. | |
| 2022/0036082 | A1 | 2/2022 | Varadarajan et al. | |
| 2024/0027645 | A1 * | 1/2024 | Niwa ..................... | H04N 25/60 |
| 2024/0214697 | A1 * | 6/2024 | Yamamoto ............ | H04N 25/53 |

FOREIGN PATENT DOCUMENTS

| | | |
|---|---|---|
| WO | WO 2021044807 A1 | 3/2021 |
| WO | WO 2021159231 A1 | 8/2021 |

* cited by examiner

*Primary Examiner* — Quan Pham

(74) *Attorney, Agent, or Firm* — MUNCY, GEISSLER, OLDS & LOWE, P.C.

(57)　　　　　　　ABSTRACT

An image sensor for color imaging using arbitrary-color-filter-array event data is provided. The image sensor comprises: a plurality of color imaging pixels and a plurality of color event pixels. An image signal of a first color imaging pixel included in the plurality of color imaging pixels is determined based on a first color signal of the first color image pixel and at least a color event data of one or more color event pixels included in the plurality of color event pixels. The color event data is generated in a temporal relation to the generation of the first color signal.

21 Claims, 8 Drawing Sheets

FIG. 1

METHOD FOR COLOR IMAGING USING ARBITRARY-COLOR-FILTER-ARRAY EVENT DATA AND IMAGE SENSOR

BACKGROUND OF THE INVENTION

1. Field of the Invention

The present disclosure relates to an image sensor, and more particularly, to an image sensor for color imaging using arbitrary-color-filter-array event data.

2. Description of the Related Art

The related art for a patent specification of a method of color imaging involves the combination of CMOS image sensors (CIS) and event-based vision sensors (EVS). CISs have been widely used in digital cameras and other imaging devices due to their power efficiency and fast readout speeds. Although CISs offer great image and/or video capturing capabilities, one of their limitations is that it is difficult for normal image/video sensors to provide ultra-high frame rates and ultra-high speed capture capabilities that may be useful in a variety of applications such as high-speed motion, machine vision, gaming, and artificial intelligence sensing areas. In a typical operation, CISs utilize active pixel sensing elements, which require certain exposure time intervals in order to integrate small photo-currents, and then output the image data in image frames in the acquisition order. In order to capture high speed motion, the active pixel sensing elements have to operate at very high frame rates. This results in massive quantities of data output by the traditional active pixel sensing elements. This output data usually contains a very high level of redundancy from frame to frame, much of which may be used to convey the same static or slow-changing background of the field of view. In other words, large amounts of background information are constantly sampled, re-sampled, output, and then reprocessed with traditional active pixel sensing elements. Attempts to provide typical image/video sensors to with such ultra-high frame rates and ultra-high speed capabilities have resulted in compromised solutions that provide poor quality image/video captures compared to their normal image sensor counterparts.

On the other hand, EVSs, also known as neuromorphic sensors, are a recent development that mimics the functioning of the human eye and brain. These sensors detect changes in the scene and capture only the relevant information, resulting in low power consumption and high dynamic range.

SUMMARY OF THE INVENTION

One aspect of the present disclosure provides an image sensor. The image sensor comprises a plurality of color imaging pixels and a plurality of color event pixels. An image signal of a first color imaging pixel of the plurality of color imaging pixels is determined based on a color signal of the first color image pixel and color event data of one or more color event pixels of the plurality of color event pixels. The color event data is detected or otherwise received in a temporal relation with the generation of the color signal.

In some embodiments, the color event data is generated during an exposure or integration time interval of the first color imaging pixel. The color event data may be generated within an event detection time interval that is the same as the exposure or integration time interval of the first color imaging pixel. In some embodiment, the color event data is received within a specific time interval after a time at which the color signal is received. In some embodiments, the color event data is generated within a specific time interval before a time at which the color signal is generated. In some embodiments, a first set of color event data is received within a first time interval before a time at which the color signal is generated, and a second set of color event data is received within a second time interval after a time at which the color signal is generated. In such embodiments, the image signal of the first color imaging pixel of the plurality of color imaging pixels is determined based on the color signal of the first color image pixel, the first color event data of one or more color event pixels of the plurality of color event pixels, and the second color event data of one or more color event pixels of the plurality of color event pixels.

Another aspect of the present disclosure provides a method of color imaging. The method comprises: defining a target CIS color channel; selecting one or more EVS pixels depending on proximity to the target CIS color channel; applying a set of color conversion model parameters to EVS data of the one or more EVS pixels to generate color space data; and fusing the color space data with the image signal of the target CIS color channel.

Another aspect of the present disclosure provides an EVS-to-CIS color space conversion unit. The EVS-to-CIS color space conversion unit performs the following steps: defining a target CIS color channel; selecting one or more EVS pixels depending on proximity to the target CIS color channel; applying a set of color conversion model parameters to EVS data of the one or more EVS pixels to generate color space data; and returning the generated color space data.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, dimensions of the various features may be arbitrarily increased or reduced for clarity of discussion.

FIG. 1 illustrates a hybrid image sensor, in accordance with some embodiments of the present disclosure.

DETAILED DESCRIPTION OF THE DISCLOSURE

Figure 2:
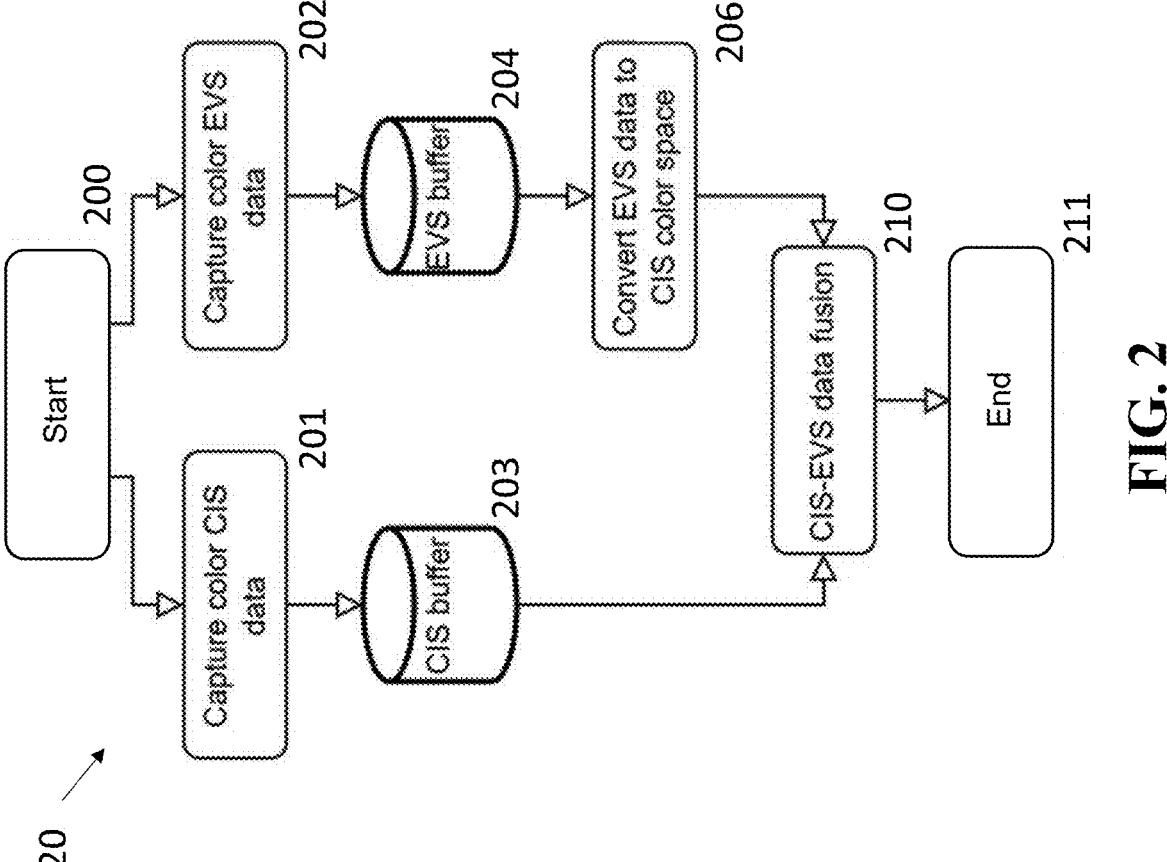
FIG. 2 illustrates a flow chart of a method of color imaging, in accordance with some embodiments of the present disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

As used herein, although the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from normal deviation found in the respective testing measurements. Also, as used herein, the terms "substantially," "approximately" and "about" generally mean within a value or range that can be contemplated by people having ordinary skill in the art. Alternatively, the terms "substantially," "approximately" and "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages, such as those for quantities of materials, durations of times, temperatures, operating conditions, ratios of amounts, and the likes thereof disclosed herein, should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

A frame camera equipped with a CMOS image sensor (CIS) offers numerous advantages, including synchronous images, spatial dense information, adjustable exposure, image absolute intensity. For a global shutter CIS, synchronous image capture is allowed to ensure that all pixels are exposed simultaneously. This feature eliminates the risk of motion blur or distortion that may occur with sequential image capture. As a result, the frame camera can accurately capture fast-moving objects or scenes with high dynamic ranges. The CIS provides spatial dense information, meaning that it can capture a large number of pixels in a given area. This high pixel density enables the camera to capture fine details and produce high-resolution images. Whether it is for scientific research, surveillance, or professional photography, the frame camera with a CIS can deliver sharp and detailed images.

The CIS may further incorporate a feature of adjustable exposure time. This feature allows the camera to adapt to different lighting conditions and capture images with optimal brightness and contrast. By adjusting the exposure settings, users can ensure that their images are properly exposed, even in challenging lighting situations. Furthermore, the CMOS image sensor offers image absolute intensity, which refers to the ability to accurately measure the intensity of light in an image. This feature is particularly useful in scientific applications, where precise measurements are required. With a CMOS image sensor (CIS), the frame camera can provide accurate and reliable intensity measurements, making it suitable for various scientific experiments and research. The CIS is also well-suited for capturing static scenes. It excels in capturing still images with minimal noise and distortion. This makes it ideal for applications such as landscape photography, architectural photography, or any situation where a stable and clear image is desired.

An event camera with an event-based vision sensor revolutionizes the way we capture and process visual information. Unlike traditional cameras that capture images at a fixed rate, event cameras operate on a completely different principle, offering several advantages that make them highly desirable in various applications. One of the key advantages of event cameras is their ability to capture asynchronous data. Instead of capturing frames at a fixed rate, event cameras only capture and transmit data when there is a change (change in light intensity) in the scene. This means that they are extremely efficient in terms of data transmission and storage, as they only capture and transmit the relevant information. This asynchronous nature allows event cameras to capture fast-moving objects with high accuracy and minimal motion blur, making them ideal for applications such as robotics, autonomous vehicles, and sports analysis.

Another significant advantage of event cameras is their ability to provide temporally dense information. Traditional cameras capture a series of frames at a fixed rate, which may result in missing important details between frames. In contrast, event cameras capture every single change in the scene, providing a continuous stream of information with microsecond-level temporal resolution. This enables event cameras to capture fast and subtle movements that would be missed by traditional cameras, making them suitable for applications such as object tracking, gesture recognition, and motion analysis. Event cameras also excel in capturing scenes with high dynamic range. Traditional cameras struggle to capture scenes with extreme variations in lighting conditions, often resulting in overexposed or underexposed areas. Event cameras, on the other hand, have a high dynamic range, allowing them to capture details in both bright and dark areas simultaneously. This makes event cameras ideal for applications such as surveillance, outdoor imaging, and HDR imaging. Furthermore, event cameras offer the advantage of low power consumption. Since they only capture and transmit data when there is a change in the scene, event cameras require significantly less power compared to traditional cameras that continuously capture frames. This makes event cameras suitable for battery-powered devices and applications where power efficiency is crucial. In conclusion, event cameras, or event-based vision sensors, are a groundbreaking technology that offers several advantages over traditional cameras. Their ability to capture asynchronous images, provide temporally dense information, eliminate image blur, and offer high dynamic range makes them highly desirable in various fields such as robotics, autonomous vehicles, surveillance, and more. With their unique capabilities, event cameras are poised to revolutionize the way we capture and process visual information in the future.

Event-based vision sensors (EVSs) are often monochrome sensors. Monochrome sensors cannot capture color information from the scene. Accordingly, in some cases, very different colors might generate the same response on an event-based vision sensor. In order to overcome such issue, color filter arrays can be used to capture color information.

To combine the strengths of both CISs and EVSs and to compensate for each other's weaknesses, methods for combining arbitrary color filter array (CFA) color-sensitive conventional (CMOS) and neuromorphic/EVS data are disclosed. The combination of CISs and EVSs offers several advantages. For example, it enables high-speed video reconstruction. CISs capture frames at a fixed rate. However, EVSs only capture changes in the scene, resulting in a sparse representation of the visual information. By combining the two, it is possible to reconstruct high-speed videos by filling in the gaps between the CIS frames with EVS data. This allows for the capture of fast-moving objects and actions that would otherwise be missed by traditional CISs alone.

Another advantage is motion blur reduction. CIS frames may suffer from motion blur when capturing fast-moving objects within an integration time interval of each image frame where the position of fast-moving object vary between the start and end of the integration time. On the other hand, EVSs capture events with high temporal resolution, resulting in less motion blur. By combining the two sensors, it is possible to reduce motion blur in the final image or video, resulting in sharper and more detailed visuals.

Furthermore, the combination of CIS and EVS data may allow for high dynamic range (HDR) imaging with no ghosting. High Dynamic Range (HDR) imaging involves capturing multiple exposures of a scene to capture both the bright and dark areas accurately. However, traditional HDR techniques can result in ghosting artifacts when objects move between exposures. EVSs, with their high temporal resolution, can capture events without any motion blur, allowing for frame deblurring and temporal alignment that will result in accurate HDR imaging without ghosting artifacts.

Additionally, the combination of these sensors makes object recognition and tracking easier through color cues. CMOS image sensors capture color information, which can be used for object recognition and tracking. By combining the color information captured by CMOS image sensors with the high temporal resolution captured by event-based vision sensors, it is possible to track objects more accurately and efficiently. The color cues provide additional information that can help distinguish objects from the background and improve the accuracy of object recognition algorithms.

Methods for combining CISs and EVSs are compatible with applications with multiple cameras or applications with hybrid systems. For example, data of an EVS camera can be combined with data of a CIS camera to output combined image data. Additionally, CIS pixels and EVS pixels can be integrated on the same sensor (e.g., on a single chip) so as to form a hybrid image sensor. The CIS pixels and EVS pixels can be arranged in different patterns for the hybrid image sensor according to the requirements for intensities and events. The ratio of the CIS pixels and EVS pixels on the hybrid image sensor can also vary according to the requirements for intensities and events.

In some embodiments of the present disclosure, the plurality of event sensing pixels and the plurality of image sensing pixels can be formed together as a hybrid structure, thereby simplifying the installment of the image sensing apparatus.

Hybrid image sensors, combining EVS pixels and CIS pixels, offer a range of advantages that make them highly desirable in the field of computer vision. Their ability to capture spatially and temporally dense images, eliminate motion blur, and provide high dynamic range imaging without ghosting make them ideal for a wide range of applications, including robotics, autonomous vehicles, and sports analysis. Hybrid image sensors can also provide easier object recognition and tracking through color cues.

To combine CIS and EVS information, monochrome event data cannot be relied on as it is unable to provide any information about the chromaticity of the objects that triggered the events. Applications such as slow motion video generation or de-blurring require color events to achieve satisfactory results. Accordingly, Color Filter Arrays (CFAs) overlaid on EVS pixels are desired. Furthermore, in order to maximize the sensitivity of EVS data, Color Filter Arrays (CFAs) different from those of the CIS data (with a spectrally wider QE curve) may be used. Since the color imaging data and the color event data may belong to different color spaces (with different CFA patterns), some of the data should be converted to a common color space before being combined.

Figure 1:
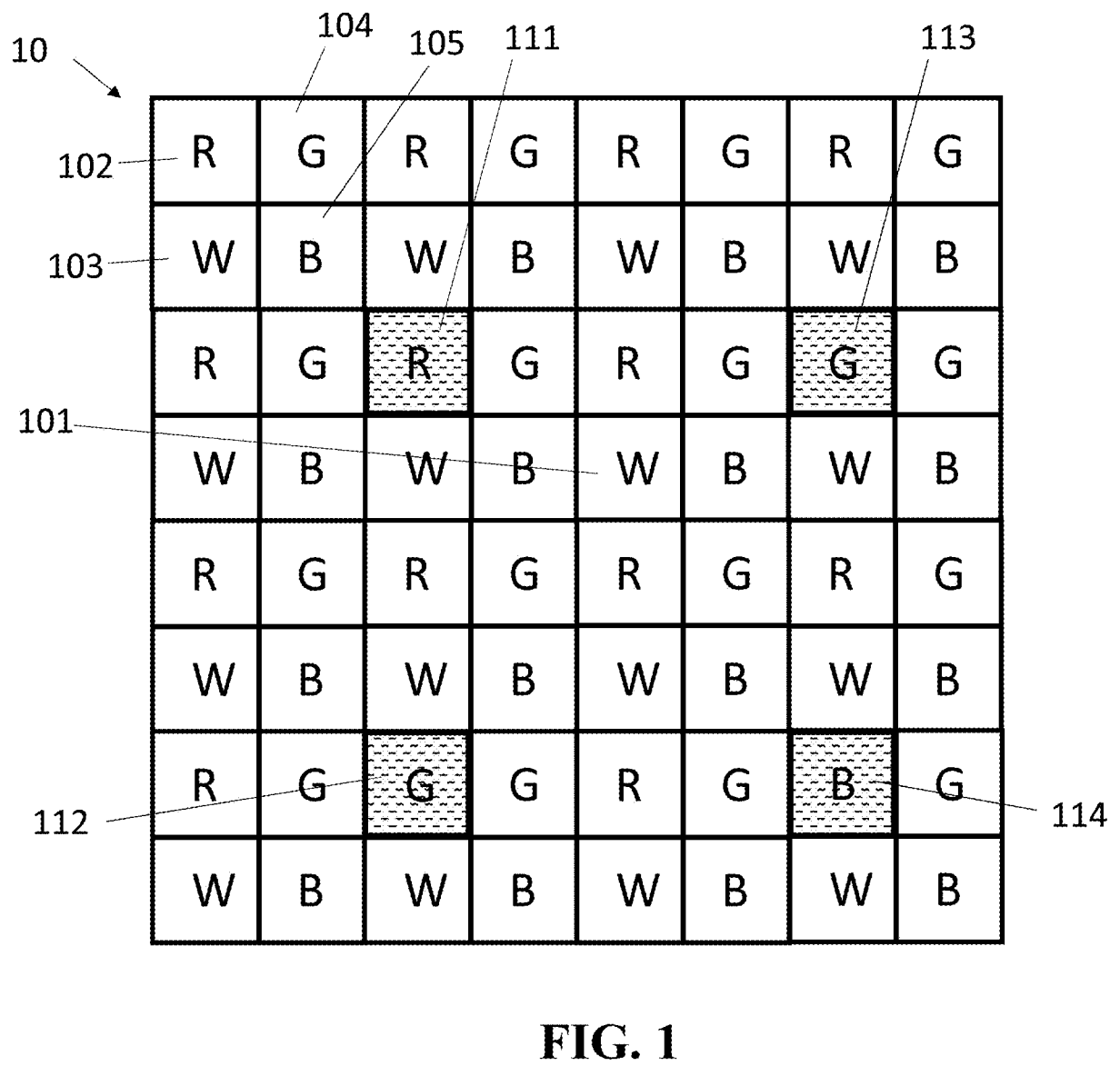

FIG. 1 illustrates a hybrid image sensor 10, in accordance with some embodiments of the present disclosure.

As shown in FIG. 1, the hybrid image sensor 10 comprises a plurality of color imaging pixels 101, 102, 103, 104, 105 and a plurality of color event pixels 111, 112, 113, 114. In embodiments, the plurality of color imaging pixels 101, 102, 103, 104, 105 and the plurality of color event pixels 111, 112, 113, 114 may be arranged to form a pixel array. The pixel array may be a two-dimensional (2D) array with the plurality of color imaging pixels 101, 102, 103, 104, 105 and the plurality of color event pixels 111, 112, 113, 114 arranged into rows and columns. Although only the five color imaging pixels 101, 102, 103, 104, 105 of the hybrid image sensor 10 are marked with reference numerals, all the pixels shown in the hybrid image sensor 10 without dotted backgrounds are color imaging pixels. In some embodiments of the present disclosure, for simplicity, the color imaging pixels are also referred as CIS pixels. As for the pixels 111, 112, 113, 114 in the hybrid image sensor 10 with dotted backgrounds, they are the color event pixels. In some embodiments of the present disclosure, for simplicity, color event pixels are also referred to as EVS pixels.

Although in the illustrated embodiments the plurality of CIS and EVS pixels in the hybrid image sensor 10 are arranged to have a color pattern consisting of "RED", "GREEN", "BLUE" and "WHITE" or RGBW CFA pattern, in other embodiments of the present disclosure, various CFA patterns can be used for the plurality of CIS and EVS pixels in the hybrid image sensor 10, such as red, green, green, blue (RGGB), red, clear, clear, blue (RCCB), or red, blue, green, clear (RGBC), or red, green, blue, infrared, (RGGIR), or cyan, yellow, yellow, magenta (CYYM), or the like. In some embodiments of the present disclosure, the color imaging pixels and the color event pixels can have different CFA patterns. For example, color imaging pixels may be arranged to have an RGBC pattern, while color event pixels may be arranged to have cyan, yellow, yellow, magenta (CYYM) pattern. In another example, color imaging pixels may be arranged to have a Bayer pattern while color event pixels may be arranged to have red, blue, green, clear (RBGC) pattern or cyan, yellow, yellow, magenta (CYYM) pattern.

In some embodiments of the present disclosure, an image signal of a first color imaging pixel 101 included in the plurality of color imaging pixels 101, 102, 103, 104, 105 is determined based on a color signal of the first color image pixel 101 and color event data of the color event pixels 111, 113, 114 included in the plurality of color event pixels 111, 112, 113, 114.

In embodiments, the color event data of one or more color event pixels 111, 113, 114 included in the plurality of color event pixels 111, 112, 113, 114 is detected or otherwise received in a temporal relation with the generation of the color signal. For example, the color event data may be captured within a specific time interval after a time at which a corresponding color signal is received. For another example, the color event data may be captured within a specific time interval before a time at which a corresponding color signal is received.

In some embodiments, the color event data is captured or otherwise generated during an exposure or integration time interval of the first color imaging pixel 101. The color event data may be generated within an event detection time interval that is the same as the exposure or integration time interval of the first color imaging pixel. In some embodiments, the color event data is received within a specific time interval after a time at which the color signal is received. In some embodiments, the color event data is generated within a specific time interval before a time at which the color signal is generated. The specific time interval maybe configured based on at least the exposure (or integration) time interval of the first color imaging pixel 101 and the readout time of the color signal.

In further some embodiments, a first set of color event data may be received within a first time interval before a time at which the color signal is generated, and a second set of color event data may be received within a second time interval after a time at which the color signal is generated. In such embodiments, the image signal of the first color imaging pixel (e.g., first color imaging pixel 101) of the plurality of color imaging pixels is determined based on the color signal of the first color image pixel 101, the first color event data of one or more color event pixels of the plurality of color event pixels, and the second color event data of one or more color event pixels of the plurality of color event pixels. The first time interval and the second time interval may be configured in view of an exposure or integration interval of the first color imagining pixel 101.

In some embodiments of the present disclosure, the one or more color event pixels 111, 113, 114 are ones of the plurality of color event pixels, 111, 112, 113, 114 being correlated to the first color image pixel 101 (e.g., spatially or temporally correlated to the first color image pixel 101).

In some embodiments of the present disclosure, the one or more color event pixels 111, 113, 114 are ones of the plurality of color event pixels, 111, 112, 113, 114 being located in close proximity to the first color imaging pixel 101. In some embodiments of the present disclosure, a color sensed by the first color image pixel 101 is different from a color associated with one of the one or more color event pixels 111, 113, 114. However, in some embodiments of the present disclosure, a color sensed by the first color image pixel 101 may be identical to a color of one of the one or more color event pixels 111, 113, 114 that are used to determine the image signal of the first color imaging pixel 101.

In some embodiments of the present disclosure, image signals of each color imaging pixel included in the plurality of color imaging pixels in the hybrid image sensor 10 are determined based on a color signal of the color image pixel and the color event data of one or more color event pixels included in the plurality of color event pixels 111, 112, 113, 114. In some embodiments of the present disclosure, the one or more color event pixels are correlated to each color imaging pixel of the plurality of color imaging pixels. In some embodiments of the present disclosure, the first color imaging pixel 101 is positioned within a region of interest of the plurality of color image pixels 101, 102, 103, 104, 105.

FIG. 2 illustrates a flow chart 20 of a method of color imaging, in accordance with some embodiments of the present disclosure. The flow chart 20 may be executed by a processor included in a hybrid image sensor.

The method may start from block 200. In some embodiments of the present disclosure, color CIS data is captured from the plurality of color imaging pixels 101, 102, 103, 104, 105 in block 201. In block 203, the color CIS data is stored into a CIS data buffer. The CIS data buffer may be included in a memory bank on the hybrid image sensor. Similarly, in some embodiments of the present disclosure, color EVS data is captured from the plurality of color event pixels 111, 112, 113, 114 in block 202. In block 204, the color EVS data is stored into an EVS buffer. The EVS data buffer may be included in a memory bank on the hybrid image sensor. In embodiments, block 202 may be implemented after block 201.

To combine the color CIS data and the color EVS data, the color EVS data stored in the EVS buffer is converted to the CIS color space in step 206. In block 210, the fusion of the color CIS data and the color EVS data is performed. The method ends at block 211. In some embodiments of the present disclosure, the method of FIG. 2 is performed in real time.

Figure 3:
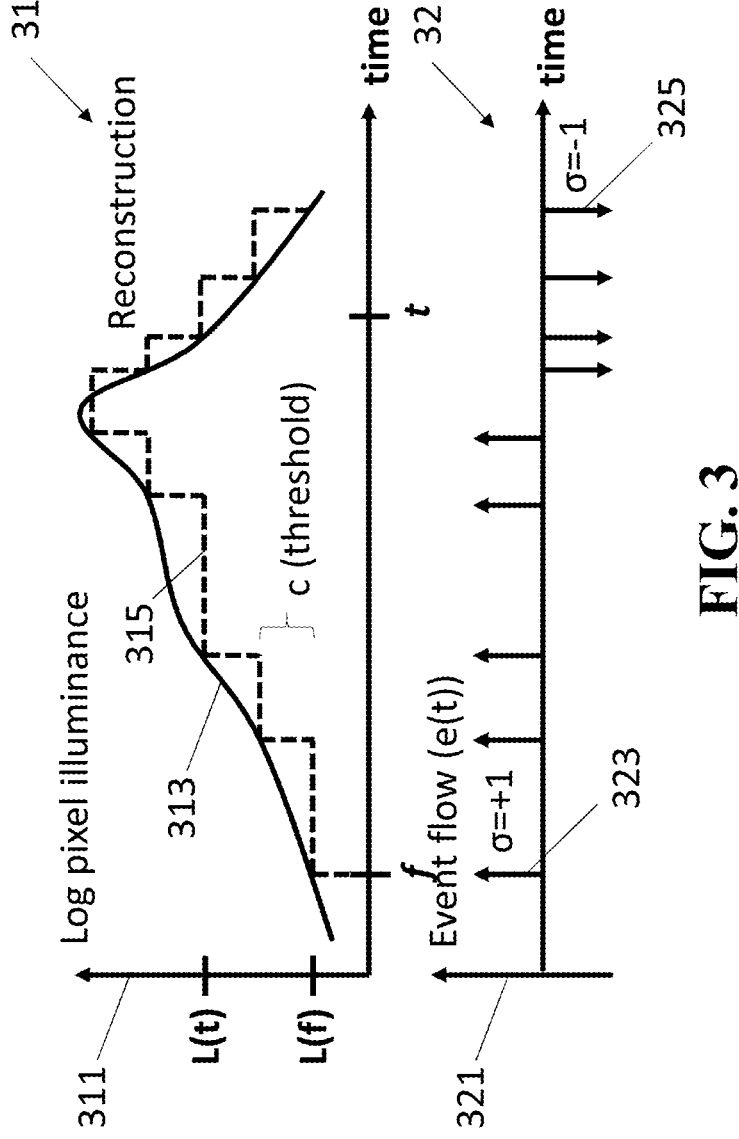
FIG. 3 illustrates time diagrams of the log pixel illuminance and the event flow, in accordance with some embodiments of the present disclosure.

FIG. 3 illustrates time diagrams of the log pixel illuminance and the event flow, in accordance with some embodiments of the present disclosure.

FIG. 3 shows an EVS-to-CIS color space conversion illustrating how color events from color event pixels 111, 112, 113, 114 are used to determine a given CIS color channel. In some embodiments of the present disclosure, the events are accumulated through event time integral shown as follows:

$$E_{p_i}(t) = f(E_C(t)) \tag{1}$$

wherein $p_i \in P$, $c_i \in C \cdot P$ is a set of CIS color channels, and C is a set of EVS color channels. In some embodiments of the present disclosure, when there are four CIS color channels and four EVS color channels.

$$P = \{p_1, p_2, p_3, p_4\} \tag{2}$$

$$C = \{c_1, c_2, c_3, c_4\} \tag{3}$$

Accordingly, an arbitrary combination of the four EVS color channels to obtain a given CIS color channel can be represented as follows:

$$E_{p_i}(t) = f(E_C(t)) = f\left(E_{c_1}(t), E_{c_2}(t), E_{c_3}(t), E_{c_4}(t)\right) \qquad (4)$$

That is, the event integral for any CIS color channel $p_i$ is a function of the event integrals of the event color channels $c_i$.

The function of the event time integral can be shown as follows:

$$E(t) = \int_f^t e(s)ds \qquad (5)$$

wherein f is a reference time, t represents the endpoint time for event accumulation.

$L(f)$ is the logarithm of the pixel illuminance of the given CIS color channel as reference. The logarithm of the temporally aligned image $L(t)$ can be calculated as follows:

$$L(t)=L(f)\exp(cE(t)),$$

wherein c is an event detection threshold value.

Accordingly, the CIS data at the reference time f and the event integral between time f and time t are combined to obtain a temporal estimation for a given color event pixel at the time t.

FIG. 3 includes two time diagrams 31 and 32. As shown in FIG. 3, the vertical axis 311 of time diagram 31 is the logarithm of the pixel illuminance, and the vertical axis 321 of the time diagram 32 is the event flow $e(t)$. Each of the impulses in time diagram 32 means a detected event of one of the color event pixels. The detected events include positive events and negative events corresponding to the change in intensity. For example, impulse 323 is a positive event (e.g., increase in light intensity) and impulse 325 is a negative event (e.g., decrease in light intensity).

Curve 313 in time diagram 31 is the actual pixel illuminance received by the given CIS color channel. Curve 315 in time diagram 31 is the reconstructed pixel illuminance of the given CIS color channel. As shown in time diagram 31, curve 315 corresponds to the integral of the impulses in time diagram 32. At the time of each positive impulse, curve 315 steps up a positive detection threshold value c, and, at the time of each negative impulse, curve 315 steps down a negative detection threshold value c. As shown in time diagram 31, curve 315 can fit curve 313 so that the reconstructed pixel illuminance can be deemed as corresponding to the actual pixel illuminance received by the given CIS color channel.

In some embodiments of the present disclosure, such process can be applied to correct one or multiple color channels in an image sensor. In some embodiments of the present disclosure, such process can be applied to correct all color channels in an image sensor. In some embodiments of the present disclosure, such process can be applied to correct all pixel locations in an image sensor. In some embodiments of the present disclosure, such process can be applied to a specific (e.g., a region of interest) in an image sensor, which may be enabled by activity monitoring, object recognition or feature recognition, etc.

In some embodiments of the present disclosure, input data formats other than event integral can be used for the color space conversion. For example, events can be represented as voxels or pseudo-frames. The number of color channels for CIS and EVS can also be arbitrary and not limited to three or four. That is, the CFA patterns for CIS and EVS can be arbitrary. In some embodiments of the present disclosure, in case that the CFA pattern for EVS is an RGGB CFA pattern, the CFA pattern of CIS can be (but not limited to) an RGGB CFA pattern or an RGBC CFA pattern. In some embodiments of the present disclosure, in case that the CFA pattern for CIS is an RGGB CFA pattern, the CFA pattern of EVS can be (but not limited to) a BCGR CFA pattern, a BYYR CFA pattern or a CyYYMg CFA pattern. Other variations of the input data formats might also include the resolution (different or the same between CIS and EVS) and the spatial arrangement. In some embodiments of the present disclosure, the spatial location of the pixels to be used may depend on the color space conversion scheme.

Figure 4:
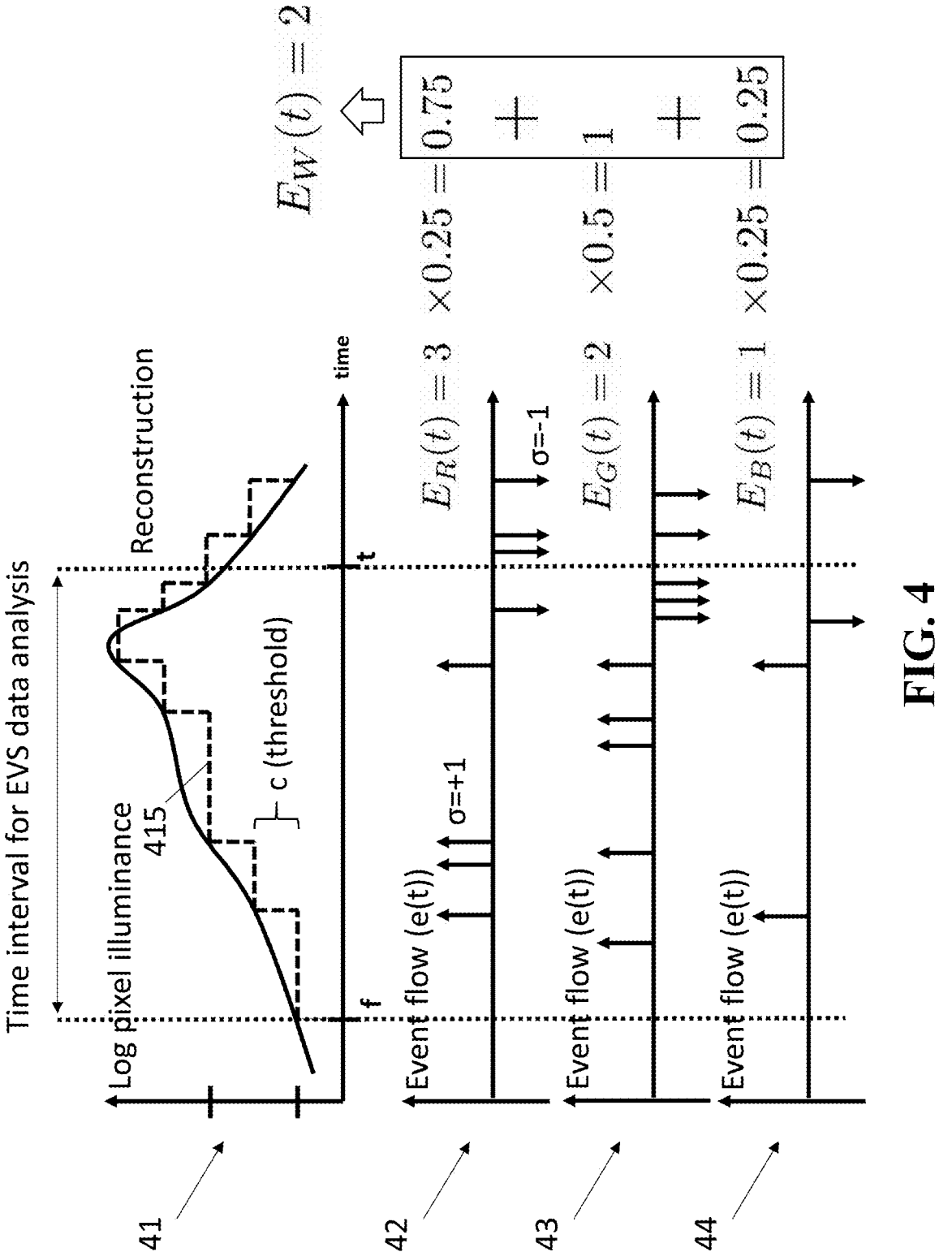
FIG. 4 illustrates time diagrams of the log pixel illuminance and the event flows, in accordance with some embodiments of the present disclosure.

FIG. 4 illustrates time diagrams of the log pixel illuminance and the event flows, in accordance with some embodiments of the present disclosure.

FIG. 3 shows reconstructing the actual pixel illuminance with detected events of one of the color event pixels. FIG. 4 further shows reconstructing the actual pixel illuminance with detected events of more than one of the color event pixels. FIG. 4 includes four time diagrams 41, 42, 43 and 44. Similar to FIG. 3, the vertical axis of time diagram 41 is the logarithm of the pixel illuminance, and the vertical axes of the time diagrams 42, 43 and 44 are the event polarity as a function of time $e(t)$. The impulses in time diagrams 42, 43 and 44 represent detected events of each of the color event pixels 111, 113 and 114 in FIG. 1. In some embodiments of the present disclosure, the color event pixel 111 is used to detect red light, the color event pixel 113 is used to detect green light, and the color event pixel 114 is used to detect blue light.

In one example, for a given color imaging pixel 101, a combination of nearby color EVS pixels such as red EVS pixel data of color event pixel 111, green EVS pixel data of color event pixel 113, and blue EVS pixel data of color event pixel 114 can be used to obtain equivalent white (W) imaging data associated with the given color imaging pixel 101. The detected events accumulated between reference time f and time t also include positive events and negative events. In one exemplary embodiments of the present disclosure, the arbitrary combination of the three color event pixels can be shown as follow:

$$E_W(t) = 0.25E_R(t) + 0.5E_G(t) + 0.25E_B(t)$$

wherein the weights 0.25, 0.5 and 0.25 are color-weighting factors that can be obtained based on an off-line color calibration process which will be explained in more detail later in FIG. 6.

As shown in time diagram 42, during the time interval from reference time f to time t, there are four positive events and one negative event. Therefore, assuming that the positive and negative contrast detection threshold are the same, the total number of impulses counted for the time interval should be three. The weight for red color event pixel is 0.25. Therefore, the weighted impulses for the time interval in time diagram 42 is 0.75 (i.e., $E_R(t)=0.25*3=0.75$).

As shown in time diagram 43, during the time interval from reference time f to time t, there are five positive events and three negative events. Therefore, assuming that the positive and negative contrast detection threshold are the same, the total number of impulses counted for the time interval should be two. The weight for green color event pixel is 0.5. Therefore, the weighted impulses for the time interval in time diagram 43 is 1 (i.e., $E_G(t)=0.5*2=1$).

As shown in time diagram 44, during the time interval from time f to time t, there are two positive events and one negative event. Therefore, assuming that the positive and negative contrast detection threshold are the same, the total number of impulses counted for the time interval should be one. The weight for blue color event pixel is 0.25. Therefore, the weighted impulses for the time interval in time diagram 44 is 0.25 (i.e., $E_B(t)=0.25*1=0.25$).

Accordingly, the arbitrary combination of the three color event pixels $E_W(t)$ is 2 (i.e., $E_W(t)=0.75+1+0.25$). That is, as shown in time diagram 41, curve 415, in reference to the initial starting value at reference time f, steps up two positive detection threshold value c increments at time t.

Figure 5:
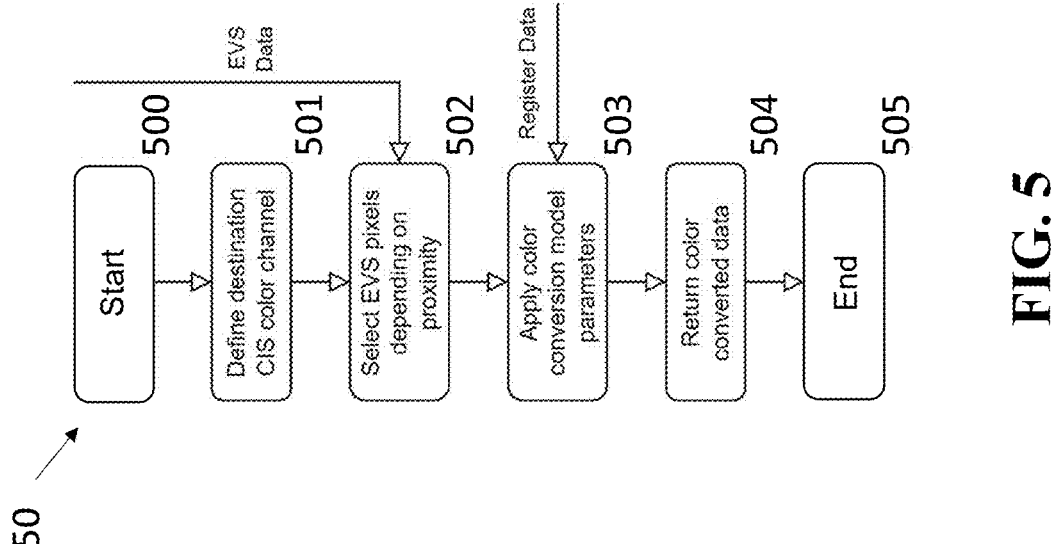
FIG. 5 is a flow chart of a method for converting color event data to color space data, in accordance with some embodiments of the present disclosure.

FIG. 5 is a flow chart 50 illustrating a method for converting color event data to color space data, in accordance with some embodiments of the present disclosure. FIG. 5 shows the details of step 206 in FIG. 2.

The method starts from step 500. In some embodiments of the present disclosure, the destination of a CIS color channel (color imaging pixel) is first defined in step 501. The target color to be computed is also defined. In step 502, the EVS pixels (the color event pixels) in close proximity to the CIS color channel (associated with the given color imaging pixel) are selected and event data of the selected EVS pixels in proximity are received from the EVS buffer as shown in FIG. 2. In step 503, a set of color conversion model parameters is retrieved from a register bank so that they can be applied to the event data of the EVS pixels to generate color space data. The register bank stores data from an offline calibration which will be explained in FIG. 6. The color EVS data is then converted to the destination CIS color space. In step 504, the color space data is returned so as to fuse the color space data with the image signal of the CIS color channel. The method ends at step 505. In some embodiments of the present disclosure, the method of FIG. 5 can be performed in real time on an image sensor like the method of FIG. 2.

Figure 6:
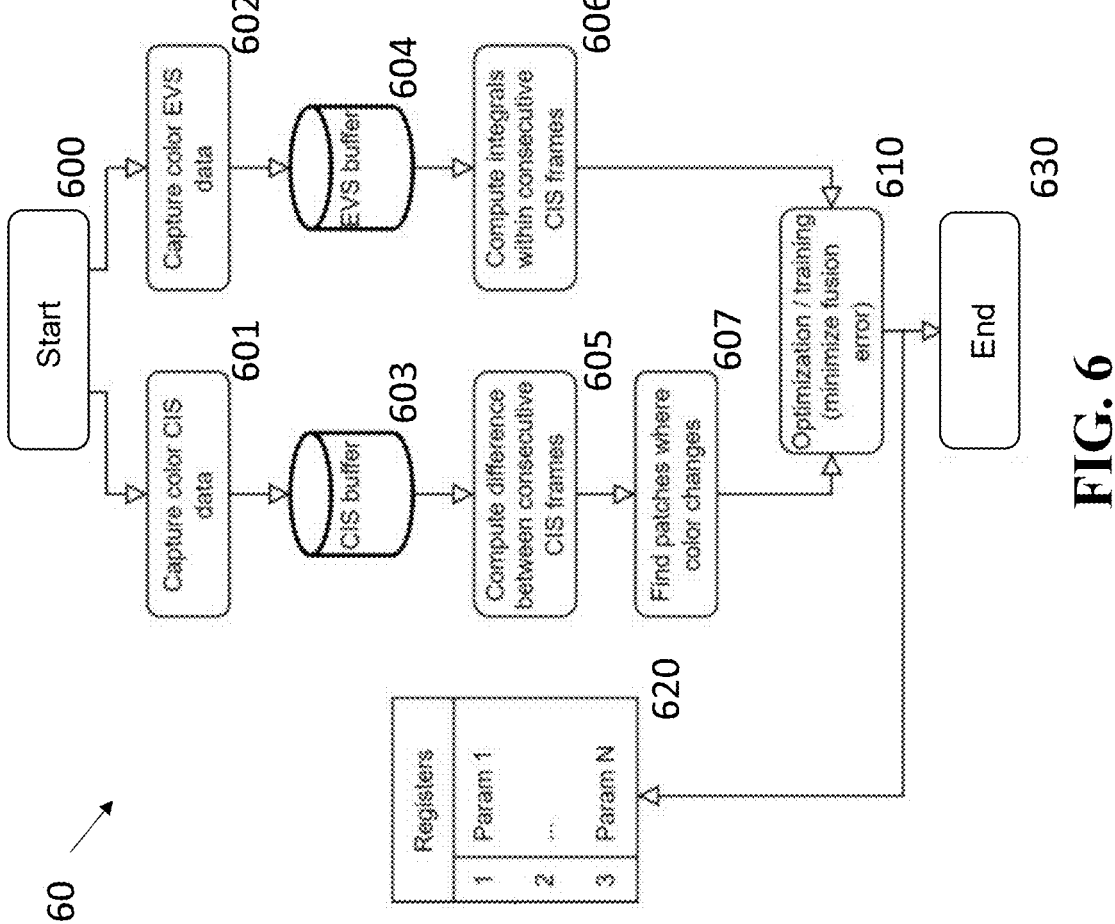
FIG. 6 illustrates a flow chart of an error minimization process, in accordance with some embodiments of the present disclosure.

FIG. 6 illustrates a flow chart 60 of an error minimization process, in accordance with some embodiments of the present disclosure.

The error minimization process starts from step 600. In some embodiments of the present disclosure, color CIS data is captured from the color imaging pixels in step 601. In step 603, the color CIS data is stored into a CIS buffer. Similarly, in some embodiments of the present disclosure, color EVS data is captured from the color event pixels in step 602. In step 604, the color EVS data is stored into an EVS buffer. In step 605, differences between the color CIS data of consecutive CIS frames are computed. In step 607, the patches where the color changes in the color imaging pixels of different CIS frames are found. In step 606, the integrals of the color EVS data within time intervals between the corresponding CIS frames are computed to obtain accumulated color EVS information. Then, the set of color conversion model parameters are optimized so as to minimize the errors between the pixel value differences and the event integrals in step 610, and the set of color conversion model parameters is stored to the register bank in step 620. The error minimization process ends at step 630. In some embodiments of the present disclosure, the error minimization process of FIG. 6 is performed in an offline manner. That is, the color conversion model parameters is predetermined through the error minimization process so that they can be stored in the register bank for later use of the method in FIG. 5.

In comparison to the methods in FIGS. 2 and 5, the error minimization process is an offline calibration and the method in FIGS. 2 and 5 are real time processes. In the offline calibration, the parameters needed for color space conversion are computed by considering CIS pixel locations where color changes and their respective event data in the same time interval. A loss function (e.g., the error between the target pixel from CIS data and its estimation) together with a predefined conversion scheme (e.g., linear, quadratic, neural network, or look-up table, etc.) guide such process. Additionally, the method in in FIGS. 2 and 5 defines the target color to be computed and retrieves the predetermined model parameters from a register bank so they can be applied to the color event data. After conversion, CIS and EVS data can be combined.

In some embodiments of the present disclosure, imaging different illuminants requires different sets of color conversion model parameters. In some embodiments of the present disclosure, the set of color conversion model parameters depends on illumination level, noise level or motion speed.

Figure 7:
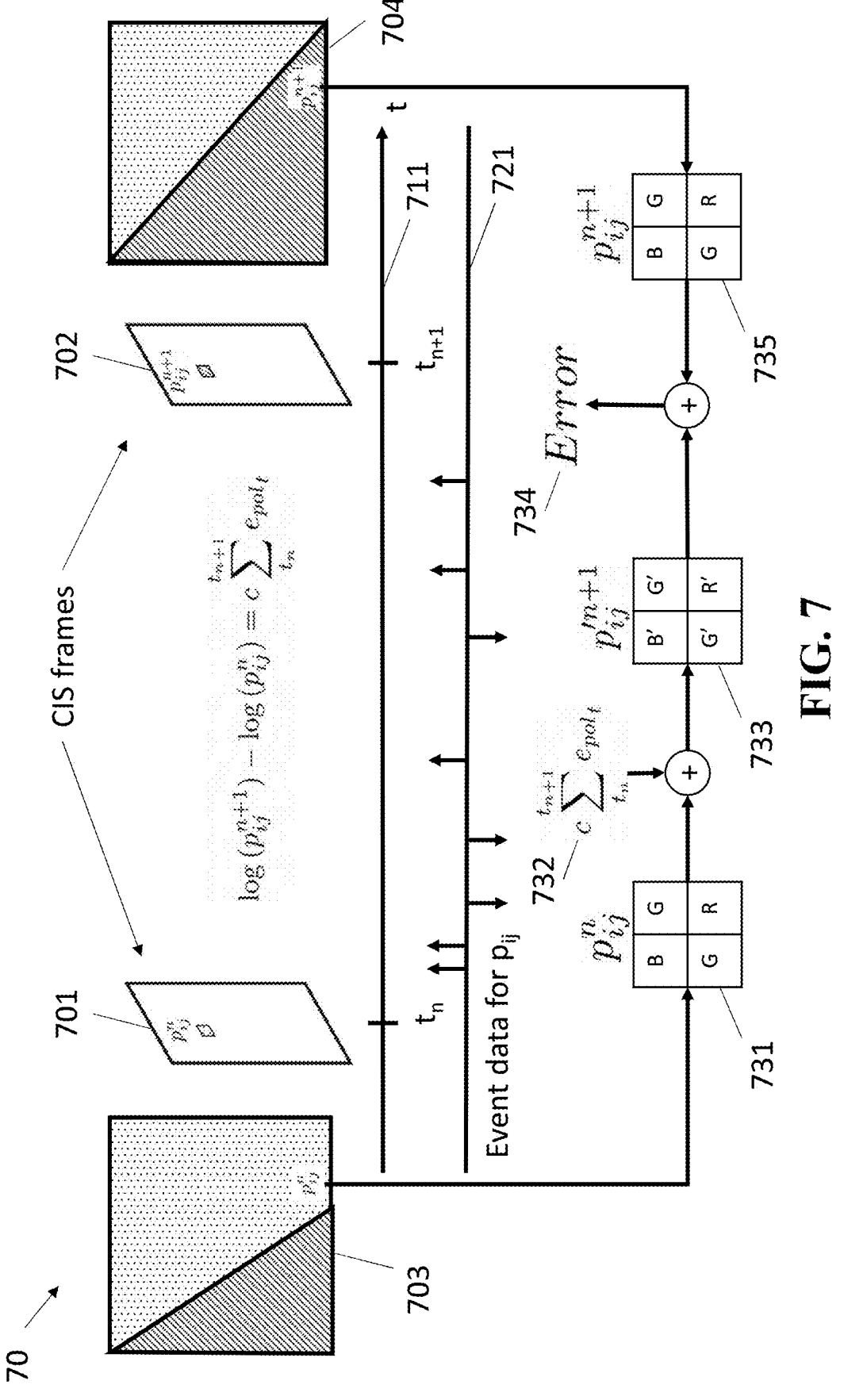
FIG. 7 illustrates a schematic diagram of the error minimization process, in accordance with some embodiments of the present disclosure.

FIG. 7 illustrates a schematic diagram 70 of the error minimization process, in accordance with some embodiments of the present disclosure.

The error minimization process in FIG. 6 is further explained in FIG. 7. FIG. 7 shows two consecutive CIS frames. The CIS frame 701 includes a pixel $$p_{ij}^n,$$

which represents the pixel on coordinates (i, j) of the CIS frame 701 at time $t_n$. The CIS frame 702 includes a pixel $$p_{ij}^{n+1},$$

which represents the pixel on coordinates (i, j) of the CIS frame 702 at time $t_{n+1}$. Time $t_n$ and time $t_{n+1}$ are also shown on the horizontal axis 711 in FIG. 7 to define a time period. As shown in block 703 and block 704, the color (e.g., red) of pixel $$p_{ij}^n$$

changes to a different color (e.g., green) of pixel $$p_{ij}^{n+1}$$

between time $t_n$ and time $t_{n+1}$. The impulses of the color EVS data within time interval between time $t_n$ and time $t_{n+1}$ are shown on the horizontal axis 721 in FIG. 7. Color CIS data 731 is the color CIS data captured in the CIS frame 701, and color CIS data 735 is the color CIS data captured in the CIS frame 702. The difference between the color CIS data 731 and the color CIS data 735 is computed. In the meanwhile, integral 732 of the color EVS data within the time interval between time $t_n$ and time $t_{n+1}$ is also computed. Applying the right or properly configured integral 732 to the color CIS data 731 can create a reconstructed color CIS data 733. The difference between the reconstructed color CIS data 733 and the color CIS data 735 that is captured in the CIS frame 702 at time $t_{n+1}$ is error 734. In some embodiments of the present disclosure, the set of color conversion model parameters (e.g., color weighting factors) is optimized so as to minimize the error 734.

In some embodiments of the present disclosure, the set of color conversion model parameters is in a form of one of the following methodologies for conversion: a linear combination, a quadratic combination, a neural network or a look-up table. In some embodiments of the present disclosure, the set of color conversion model parameters can be applied to the full frame. In some embodiments of the present disclosure, the set of color conversion model parameters can only be applied to a local region (content-dependent).

Figure 8:
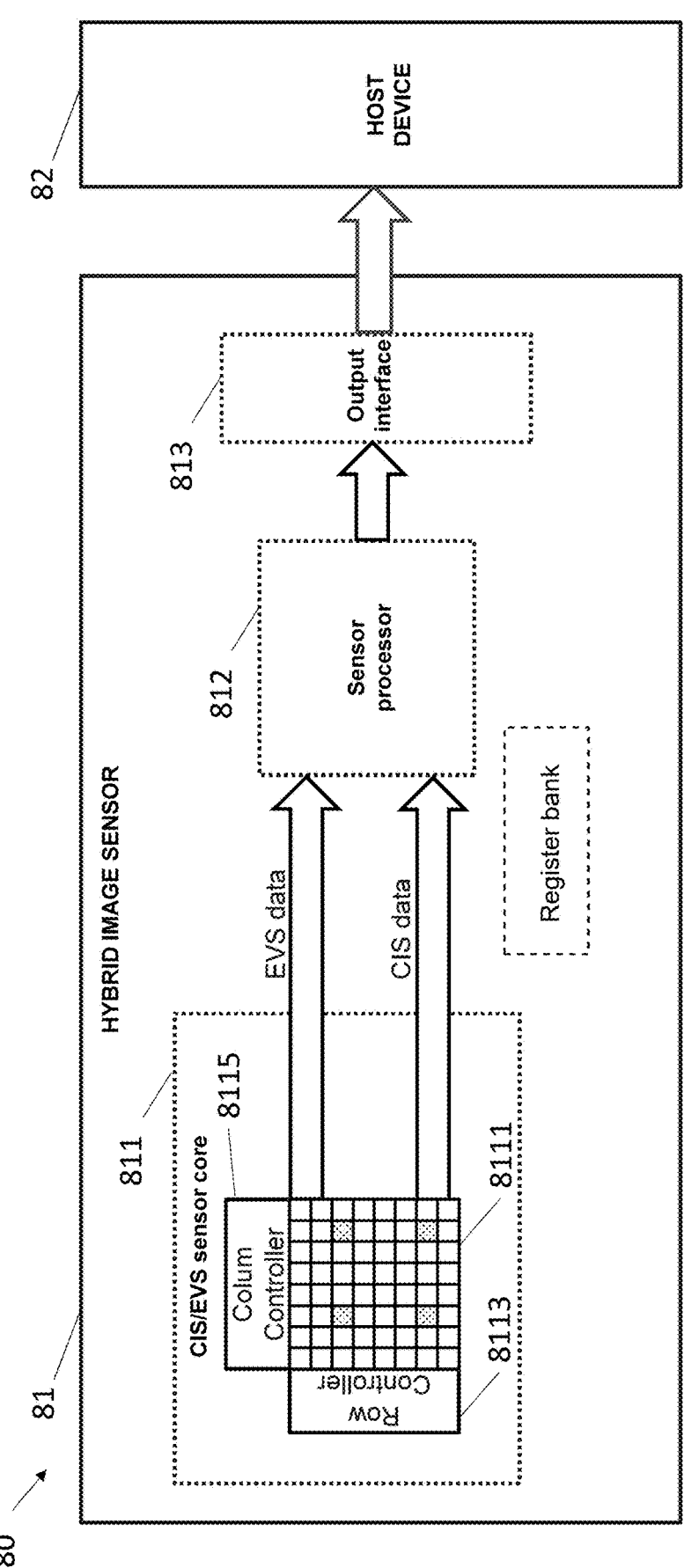
FIG. 8 illustrates a system diagram of an image system, in accordance with some embodiments of the present disclosure.

FIG. 8 illustrates a system block diagram of an image system, in accordance with some embodiments of the present disclosure.

In some embodiments of the present disclosure, the method in FIGS. 2, 5 and 6 can be performed by an image system 80 as shown in FIG. 8. In some embodiments of the present disclosure, the image system 80 includes a hybrid image sensor 81 and a host device 82. In some embodiments of the present disclosure, the method in FIGS. 2, 5 and 6 can be performed by an on-chip processor incorporated in the hybrid image sensor 81 of the imaging system 80. In some embodiments of the present disclosure, the hybrid image sensor 81 includes a CIS/EVS sensor core 811, a sensor processor 812 and an output interface 813. In some embodiments of the present disclosure, the CIS/EVS sensor core 811 includes an image array 8111, a row controller 8113 and a column controller 8115. In embodiments, image array 8111 is an example of hybrid image sensor 10 of FIG. 1 and image array 8111 includes a plurality of color imaging pixels and a plurality of color event pixels for generating color signals and color event data in response to a captured scene. In some embodiments of the present disclosure, the row controller 8113 and the column controller 8115 control the rows and columns of the pixels in the image array 8111, respectively. In embodiments, the row controller 8113 and the column controller 8115 may be configured to generate control and timing signals driving operation of the image array 8111. In some embodiments of the present disclosure, the EVS data and the CIS data outputted from the image array 8111 are transmitted to the sensor processor 812 to perform the method in FIGS. 2, 5 and 6. In some embodiments of the present disclosure, the processed results can be transmitted to the output interface 813 so as to be further transmitted to the host device 82. In embodiments, outer interface 813 may include camera serial interface, Mobile Industry Processor Interface (MIPI), Inter-Integrated Circuit (I2C) interface for communicating with the host device 82.

In some embodiments of the present disclosure, the sensor processor 812 and/or a portion of the CIS/EVS sensor core 811 can be configured to function as an EVS-to-CIS color space conversion unit. In some embodiments of the present disclosure, the EVS-to-CIS color space conversion unit and an register bank for storing one or more sets of color conversion model parameters (such as color weighting factors) for color optimization parameters can be both included or otherwise located in the hybrid image sensor 81 for latency and conversion efficiency consideration. In such embodiment, the register bank includes one or more registers and the register bank is coupled to the sensor processor 812. In some embodiments, the register bank may be allocated within a memory block of the sensor processor 812. In some embodiments of the present disclosure, the sensor processor 812 including the EVS-to-CIS color space conversion unit and the register bank is located in the host device 82 coupling to the hybrid image sensor 81 to alleviate the storage and computation need for the hybrid image sensor 81. In further some embodiments of the present disclosure, EVS-to-CIS color space conversion unit may be implemented by a processor programmed with firmware that executes a color imaging method, for example as illustrated by FIG. 5.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An image sensor, comprising:
   a plurality of color imaging pixels; and
   a plurality of color event pixels,
   wherein an image signal of a first color imaging pixel included in the plurality of color imaging pixels is determined based on a first color signal of the first color imaging pixel and at least a color event data of a set of color event pixels included in the plurality of color event pixels, wherein the color event data is generated in a temporal relation to the generation of the first color signal, and wherein the set of color event pixels includes at least three different colors.

2. The image sensor according to claim 1, wherein the set of color event pixels are ones of the plurality of color event pixels being correlated to the first color imaging pixel.

3. The image sensor according to claim 2, wherein the set of color event pixels are ones of the plurality of color event pixels being located in close proximity to the first color imaging pixel.

4. The image sensor according to claim 1, wherein the color event data is generated during an integration time of the first color imaging pixel.

5. The image sensor according to claim 4, wherein the color event data is generated within a time interval that is the same as the integration time of the first color imaging pixel.

6. The image sensor according to claim 1, wherein the color event data is generated within a time interval before and/or after a time at which the first color signal is received.

7. The image sensor according to claim 1, wherein a first color sensed by the first color imaging pixel is the same as a color of one of the one or more color event pixels.

8. The image sensor according to claim 1, wherein a first color sensed by the first color imaging pixel is different from a color of each of the one or more color event pixels.

9. The image sensor according to claim 8, wherein image signals of each individual color imaging pixel included in the plurality of color imaging pixels are determined based on a color signal of each corresponding color imaging pixel and the color event data of the one or more color event pixels included in the plurality of color event pixels.

10. The image sensor according to claim 1, wherein the one or more color event pixels are correlated to each color imaging pixel of the plurality of color imaging pixels.

11. The image sensor according to claim 1, wherein the first color imaging pixel included in the plurality of color imaging pixels is located within a region of interest of a pixel array of the image sensor.

12. A method of color imaging, the method comprising:

defining a target CMOS image sensor (CIS) color channel;

selecting one or more event-based vision sensor (EVS) pixels depending on proximity to the target CIS color channel;

applying a set of color conversion model parameters to an event data associated with the one or more EVS pixels to generate color space data, wherein associated with the one or more EVS pixels is captured within a time interval before or after a time at which a color image signal is received; and fusing the color space data with the color image signal of the target CIS color channel, wherein an error minimization process comprising:

computing differences between color CIS data of consecutive CIS frames;

computing integrals of color EVS data within time intervals between the consecutive CIS frames;

optimizing the set of color conversion model parameters that minimizes the errors between the differences and the integrals.

13. The method according to claim 12, wherein the set of color conversion model parameters is stored in a register bank.

14. The method according to claim 13, wherein the set of color conversion model parameters comprising a set of weight factors associated with the one or more EVS pixels is predetermined through the error minimization process.

15. The method according to claim 12, wherein imaging different illuminants requires different sets of color conversion model parameters.

16. The method according to claim 12, wherein the set of color conversion model parameters depends on an illumination level, a noise level or a motion speed.

17. The method according to claim 12, wherein the set of color conversion model parameters is in a form of one of a linear combination, a quadratic combination, a neural network or a look-up table.

18. The method according to claim 12, wherein the set of EVS pixels includes at least three different colors.

19. An image system, comprising:

an image sensor having a pixel array comprising of a plurality of color imaging pixels and a plurality of color event pixel;

a host device connected to the image sensor; and a processor programed with firmware to perform:

defining a target CIS color channel;

selecting a set of EVS pixels depending on proximity to the target CIS color channel, wherein the set of EVS pixels includes at least three different colors;

applying a set of color conversion model parameters to EVS data of the set of EVS pixels to generate color space data; and outputting the generated color space data.

20. The image system according to claim 19, wherein the set of color conversion model parameters is stored in a register bank.

21. The image system according to claim 20, wherein the processor and the register bank are included in the image sensor.

* * * * *